United States Patent
Murphrey et al.

(10) Patent No.: US 6,735,692 B1
(45) Date of Patent: May 11, 2004

(54) REDIRECTED NETWORK BOOT TO MULTIPLE REMOTE FILE SERVERS

(75) Inventors: Stephen Woodrow Murphrey, Apex, NC (US); David B. Rhoades, Apex, NC (US); Walter Leslie Robinson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 09/613,673

(22) Filed: Jul. 11, 2000

(51) Int. Cl.⁷ .......................................... G06F 15/177
(52) U.S. Cl. ................. 713/1; 713/2; 709/220
(58) Field of Search ................. 713/1, 2, 100; 709/220, 221, 222

(56) References Cited

U.S. PATENT DOCUMENTS

| | | |
|---|---|---|
| 5,557,748 A | 9/1996 | Norris |
| 5,794,031 A | 8/1998 | Nakadai |
| 5,872,968 A | 2/1999 | Knox |
| 5,875,306 A | 2/1999 | Bereiter |
| 5,974,547 A | 10/1999 | Klimenko |
| 6,009,474 A | 12/1999 | Lu et al. |
| 6,012,088 A | 1/2000 | Li et al. |
| 6,026,438 A | 2/2000 | Piazza et al. |
| 6,070,187 A * | 5/2000 | Subramaniam et al. ...... 709/220 |
| 6,175,918 B1 * | 1/2001 | Shimizu ........................ 713/1 |
| 6,317,826 B1 * | 11/2001 | McCall et al. ................. 713/1 |
| 6,421,777 B1 * | 7/2002 | Pierre-Louis et al. ......... 713/2 |
| 6,535,976 B1 * | 3/2003 | Hoggarth et al. .............. 713/2 |
| 6,611,915 B1 * | 8/2003 | Kubik et al. ................. 713/200 |

OTHER PUBLICATIONS

IBM Technical Disclosure Bulletin "Distributed Object Aviation and Communication Protocols," vol. 37, No. 7, Jul. 94.

IBM Technical Disclosure Bulletin "Method for Improving Network Availability with Redundant Network Servers," vol. 39, No. 8, Aug. 1996.

* cited by examiner

Primary Examiner—Dennis M. Butler
(74) Attorney, Agent, or Firm—Sawyer Law Group

(57) ABSTRACT

The present invention provides a method and system for directing a network boot. The method includes obtaining a bootstrap by a client, the client residing in a subnet; obtaining a configuration file by the bootstrap, where the configuration file comprises a map of subnets and their corresponding file servers; determining from the configuration file a file server corresponding to the client's subnet; and obtaining an operating system (OS) image from the corresponding local file server. The method and system provides a bootstrap which, when loaded onto a client, obtains a configuration file from the remote file server. The configuration file contains a map of the network's subnets and their corresponding local file servers. Using this configuration file, the bootstrap obtains an OS image from the local file server which services the subnet in which the client resides. In this manner, the client can perform a remote boot and have direct access to its local file server, promoting more efficient file transfers.

12 Claims, 3 Drawing Sheets

REDIRECTED NETWORK BOOT TO MULTIPLE REMOTE FILE SERVERS

FIELD OF THE INVENTION

The present invention relates to computer networks, and more particularly to remote file access in computer networks.

BACKGROUND OF THE INVENTION

The Preboot Execution Environment (PXE), developed by Intel™, extends the well-known Dynamic Host Configuration Protocol (DHCP) to provide a generic device driver interface to a bootstrap software. The bootstrap software allows a client to perform a remote boot. Conventionally, when the client boots, it first obtains the name of the bootstrap from a remote PXE boot server. The client then obtains the bootstrap from a remote file server, which typically uses the Trivial File Transfer Protocol (TFTP). Once loaded onto the client, the bootstrap obtains the operating system (OS) image from the remote TFTP server. This OS image is used to manage the client.

However, conventional PXE requires that the OS image be obtained from the remote TFTP server corresponding to the PXE boot server, i.e., the PXE boot server and the remote TFTP server are part of the same remote server. This creates a problem in a Wide Area Network (WAN) environment, where each subnet in the WAN is typically serviced by a separate file server. Thus, a client in a subnet cannot directly access files on the TFTP file server servicing its subnet. Files need to be accessed through the WAN. With large files, this is cumbersome and is an inefficient use of network resources. This may be time consuming as well, if the remote server and the client are separated by a slow router link.

Accordingly, there exists a need for a method and system for redirecting a network boot to a local file server. The present invention addresses such a need.

SUMMARY OF THE INVENTION

The present invention provides a method and system for directing a network boot. The method includes obtaining a bootstrap by a client, the client residing in a subnet; obtaining a configuration file by the bootstrap, where the configuration file comprises a map of subnets and their corresponding file servers; determining from the configuration file a file server corresponding to the client's subnet; and obtaining an operating system (OS) image from the corresponding local file server. The method and system provides a bootstrap which, when loaded onto a client, obtains a configuration file from the remote file server. The configuration file contains a map of the network's subnets and their corresponding local file servers. Using this configuration file, the bootstrap obtains an OS image from the local file server which services the subnet in which the client resides. In this manner, the client can perform a remote boot and have direct access to its local file server, promoting more efficient file transfers.

DETAILED DESCRIPTION

The present invention provides a method and system for redirecting a network boot to a local file server. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

Figure 1:
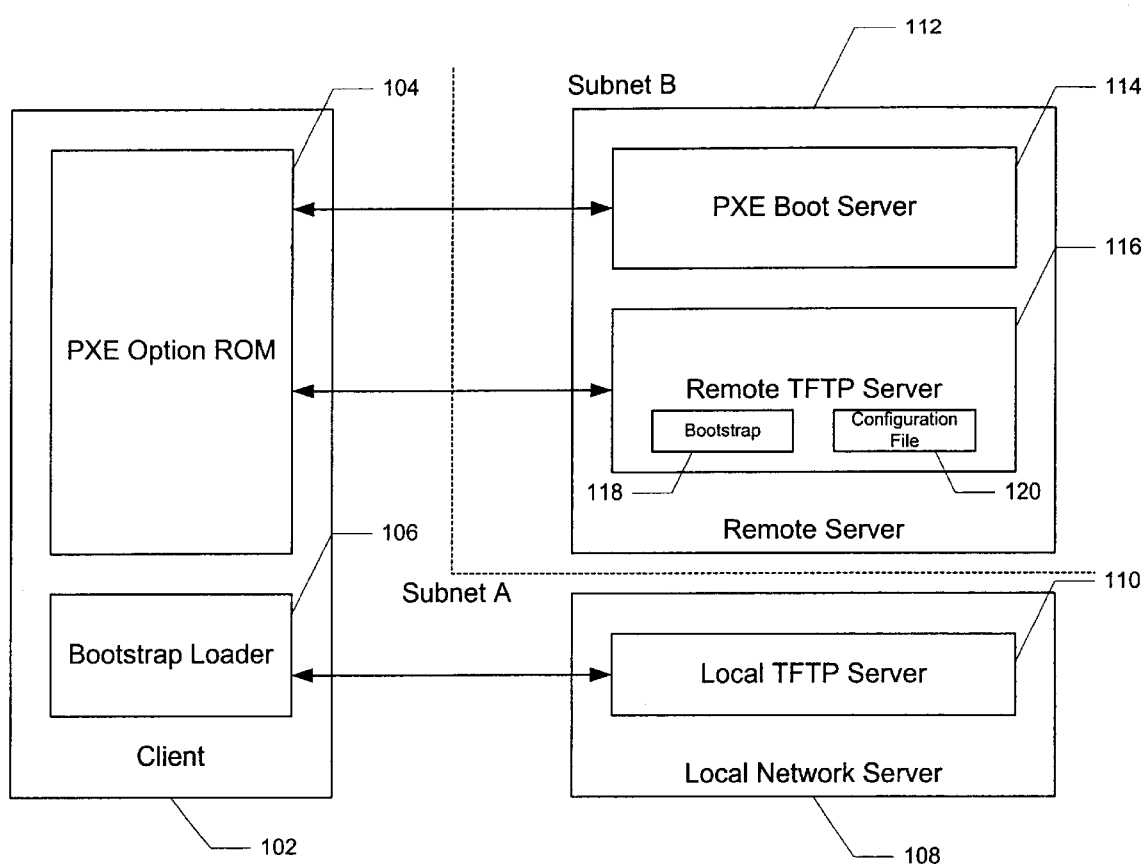
FIG. 1 is a block diagram illustrating a preferred embodiment of a Preboot Execution Environment(PXE) in accordance with the present invention.

FIG. 1 is a block diagram illustrating a preferred embodiment of a Preboot Execution Environment (PXE) in accordance with the present invention. In the preferred embodiment, the PXE is in a Wide Area Network (WAN). The PXE comprises at least two subnets, such as subnet A and B. Subnet A contains a client 102 and a local network server 108. The client 102 comprises includes a PXE option Read Only Memory (ROM) 104 and a bootstrap loader 106. The local network server 108 comprises a local Trivial File Transfer Protocol (TFTP) server 110. The PXE option ROM 104 contains code which allows the client 102 to function in a PXE. The bootstrap loader 106 is a program which stores the bootstrap 118 and other information. The local network server 108 manages subnet A and includes the local TFTP server 110 which services subnet A.

Subnet B comprises a remote PXE management server 112, which includes a PXE boot server 114 and a remote TFTP server 116. The PXE boot server 114 provides the PXE client 102 with the name of the bootstrap. The bootstrap 118 and a configuration file 120 are stored in the remote TFTP server 116. The configuration file 120 contains a map of the network's subnets and their corresponding local file servers. With the present invention, the PXE client 102 initially boots with the remote server 112, but then the boot is redirected to the local network server 108, allowing for direct access between the client 102 and the local TFTP server 110.

Figure 2:
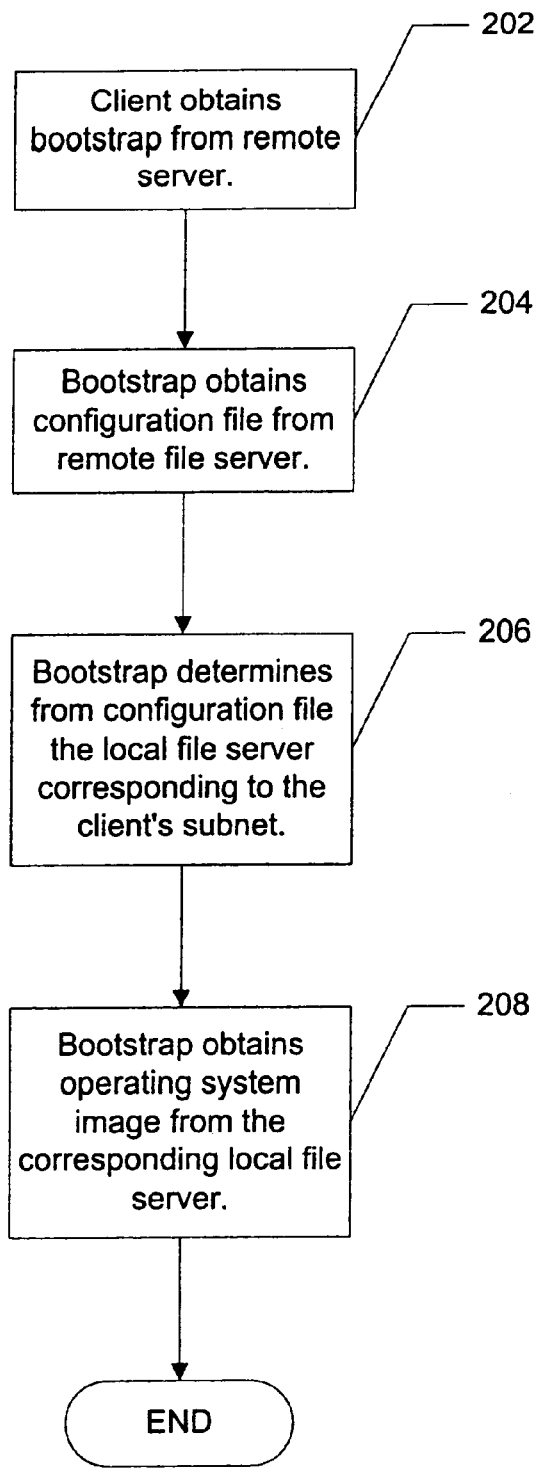
FIG. 2 is a flowchart illustrating a preferred embodiment of a method for redirecting a network boot to a local file server in accordance with the present invention.

FIG. 2 is a flowchart illustrating a preferred embodiment of a method for redirecting a network boot to a local file server in accordance with the present invention. First, the client 102 obtains a bootstrap 118 from the remote server 112, via step 202. Once the bootstrap 118 is loaded onto the client 102, the bootstrap 118 obtains a configuration file 120 from the remote file server, such as remote TFTP server 116, via step 204. The bootstrap 118 next determines from the configuration file 120 the local file server, such as local TFTP server 110, which corresponds to the client's subnet, via step 206. Then, the bootstrap 118 obtains the operating system (OS) image from the corresponding local file server 110, via step 208. This OS image is used to manage the client 102. Because the OS image is obtained from the local file server 110, the client 102 can have direct access to files on the local file server 110. Files may be transferred from the local file server 110 to the client 102 without traveling through the WAN. This maintains the advantages of a remote boot while also allowing more efficient file transfers.

Figure 3:
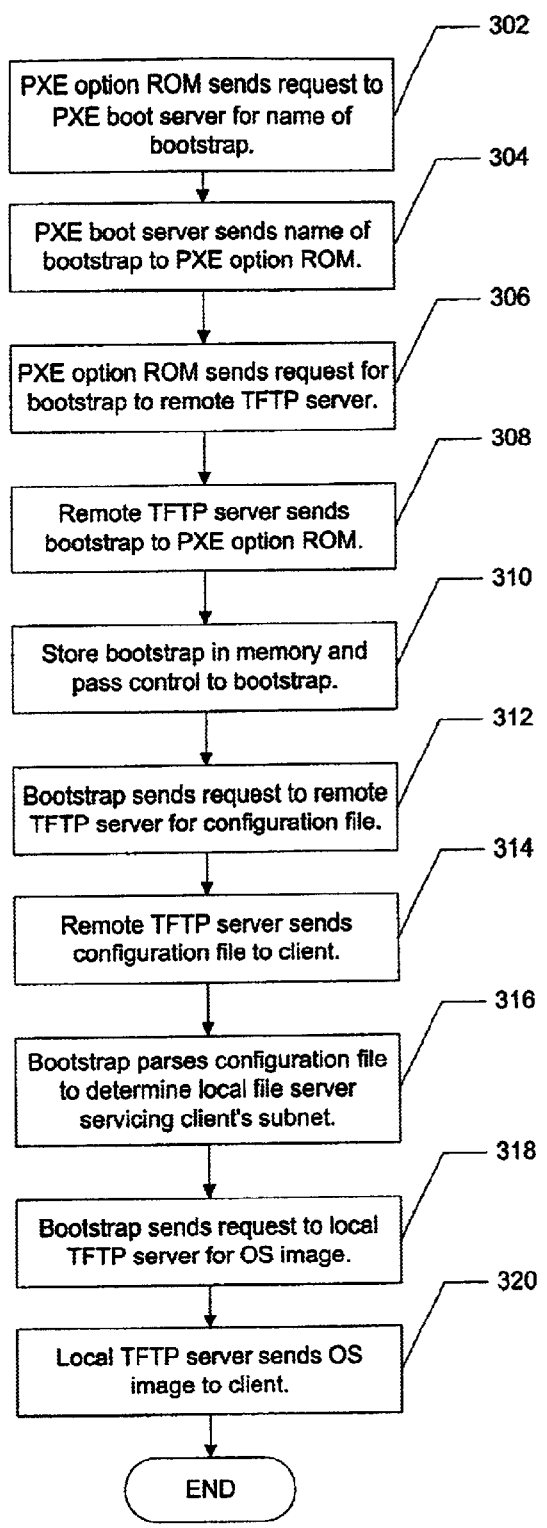
FIG. 3 is a flowchart illustrating in more detail the preferred embodiment of the method for redirecting a network boot to a local file server in accordance with the present invention.

FIG. 3 is a flowchart illustrating in more detail the preferred embodiment of the method for redirecting a network boot to a local file server in accordance with the present invention. First, the PXE option ROM 104 sends a request to the PXE boot server 114 for the name of the bootstrap 118, via step 302. The PXE boot server 114 responds by sending the name of the bootstrap 118 to the PXE option ROM 104, via step 304. The PXE option ROM 104 next sends a request for the bootstrap 118 to the remote TFTP server 116, via step 306. The remote TFTP server 116 responds by sending the bootstrap 118 to the PXE option ROM 104, via step 308. Once the complete bootstrap 118 is received into memory, the PXE option ROM 104 passes control to the bootstrap 118, via step 310.

When the bootstrap 118 obtains control, it sends a request to the remote TFTP server 116 for the configuration file 120, which contains a map of the subnets and their corresponding local TFTP servers, via step 312. The remote TFTP server 116 responds by sending the configuration file 120 to the bootstrap 118, via step 314. Once it receives the configuration file 120, the bootstrap 118 parses the configuration file to determine the local TFTP server 110 serving the client's subnet, via step 316. At this time, the bootstrap 118 may also place a small data structure concerning the subnets and their local TFTP servers in memory to be used by the OS image after it gains control. The bootstrap 118 then sends a request to the local TFTP server 110 for the OS image, via step 318. The local TFTP server 110 responds by sending the OS image to the client 102, via step 320. The OS image manages the client 102 and may optionally return to the local TFTP server 110 to obtain more files required to manage the client 102.

A method and system for redirecting a network boot to a local file server has been disclosed. The method and system provides a bootstrap which, when loaded onto a client, obtains a configuration file from the remote TFTP server. The configuration file contains a map of the network's subnets and their corresponding local TFTP servers. Using this configuration file, the bootstrap obtains an OS image from the local TFTP server which services the subnet in which the client resides. In this manner, the client can perform a remote boot and have direct access to its local TFTP server, promoting more efficient file transfers.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for directing a network boot, comprising the steps of:
   (a) obtaining a bootstrap by a client, the client residing in a subnet;
   (b) obtaining a configuration file by the bootstrap, wherein the configuration file comprises a map of subnets and their corresponding file servers;
   (c) determining from the configuration file a file server corresponding to the client's subnet; and
   (d) obtaining an operating system (OS) image from the corresponding local file server.

2. The method of claim 1, wherein the obtaining step (a) comprises:
   (a1) obtaining from a boot server a name of the bootstrap;
   (a2) obtaining the bootstrap from a remote file server;
   (a3) storing the bootstrap in a memory; and
   (a4) passing control to the bootstrap.

3. The method of claim 1, wherein the obtaining step (b) comprises:
   (b1) sending a request from the boot strap to a remote file server for the configuration file; and
   (b2) obtaining the configuration file from the remote file server.

4. The method of claim 1, wherein the determining step (c) comprises:
   (c1) parsing the configuration file by the bootstrap to determine the local file server corresponding to the client's subnet.

5. The method of claim 1, wherein the obtaining step (d) comprises:
   (d1) sending a request from the bootstrap to the local file server for the OS image; and
   (d2) receiving the OS image by the client.

6. A method for directing a network boot, comprising the steps of:
   (a) obtaining a bootstrap by a client, the client residing in a subnet;
   (b) obtaining a configuration file by the bootstrap, wherein the configuration file comprises a map of subnets and their corresponding file servers;
   (c) parsing the configuration file by the bootstrap to determine a local file server corresponding to the client's subnet;
   (d) sending a request from the bootstrap to the local file server for an OS image; and
   (e) receiving the OS image by the client.

7. A method for directing a network boot, comprising the steps of:
   (a) obtaining from a boot server a name of a bootstrap by a client, the client residing in a subnet;
   (b) obtaining the bootstrap from a remote file server;
   (c) passing control to the bootstrap;
   (d) sending a request from the bootstrap to a remote file server for a configuration file, wherein the configuration file comprises a map of subnets and their corresponding file servers;
   (e) obtaining the configuration file from the remote file server;
   (f) parsing the configuration file by the bootstrap to determine a local file server corresponding to the client's subnet;
   (g) sending a request from the bootstrap to the local file server for an OS image; and
   (h) receiving the OS image by the client.

8. A system comprising:
   a hoot server comprising a name for a bootstrap;
   a remote file server comprising the bootstrap and a configuration file, wherein the configuration file comprises a map of subnets and their corresponding file servers;
   a subnet, wherein the subnet comprises:
      a local file server comprising an OS image; and
      a client, the client comprising:
         a PXE option ROM for obtaining the bootstrap, and
         a memory for storing the bootstrap, wherein the bootstrap is capable of using the configuration file to obtain the OS image for the client.

9. A system, comprising:

a boot server comprising a name for a bootstrap;

a remote file server comprising the bootstrap and a configuration file, wherein the configuration file comprises a map of subnets and their corresponding file servers; and a subnet, comprising:
- a local file server comprising an OS image,
- a client, the client comprising:
  - a PXE option ROM for obtaining the bootstrap from the remote file server, and
  - a memory for storing the bootstrap, wherein the bootstrap is capable of using the configuration file to obtain the OS image for the client.

10. A computer readable medium with program instructions for directing a network boot, the instructions for:

(a) obtaining a bootstrap by a client, the client residing in a subnet;

(b) obtaining a configuration file by the bootstrap, wherein the configuration file comprises a map of subnets and their corresponding file servers;

(c) determining from the configuration file a file server corresponding to the client's subnet; and (d) obtaining an operating system (OS) image from the corresponding local file server.

11. A computer readable medium with program instructions for directing a network boot, the instructions for:

(a) obtaining a bootstrap by a client, the client residing in a subnet;

(b) obtaining a configuration file by the bootstrap, wherein the configuration file comprises a map of subnets and their corresponding file servers;

(c) parsing the configuration file by the bootstrap to determine a local file server corresponding to the client's subnet;

(d) sending a request from the bootstrap to the local file server for an OS image; and (e) receiving the OS image by the client.

12. A computer readable medium with program instructions for directing a network boot, the instructions for:

(a) obtaining from a boot server a name of a bootstrap by a client, the client residing in a subnet;

(b) obtaining the bootstrap from a remote file server;

(c) passing control to the bootstrap;

(d) sending a request from the bootstrap to a remote file server for a configuration file, wherein the configuration file comprises a map of subnets and their corresponding file servers;

(e) obtaining the configuration file from the remote file server;

(f) parsing the configuration file by the bootstrap to determine a local file server corresponding to the client's subnet;

(g) sending a request from the bootstrap to the local file server for an OS image; and (h) receiving the OS image by the client.

* * * * *